United States Patent [19]
Tsubouchi

[11] Patent Number: 5,711,202
[45] Date of Patent: Jan. 27, 1998

[54] VACUUM SERVO UNIT FOR A VEHICLE BRAKING SYSTEM

[75] Inventor: Kaoru Tsubouchi, Aichi pref., Japan

[73] Assignee: Aisin Seiki Kabushiki Kaisha, Kariya, Japan

[21] Appl. No.: 686,429

[22] Filed: Jul. 26, 1996

[30] Foreign Application Priority Data

Jul. 27, 1995 [JP] Japan .................................. 7-191868
Jul. 27, 1995 [JP] Japan .................................. 7-191869

[51] Int. Cl.$^6$ ............................................... F15B 13/16
[52] U.S. Cl. ................................... 91/367; 91/376 R
[58] Field of Search ........................ 91/376 R, 367; 60/545

[56] References Cited

U.S. PATENT DOCUMENTS

| | | | |
|---|---|---|---|
| 3,548,718 | 12/1970 | Utton | 91/376 R |
| 4,005,638 | 2/1977 | Takeuchi | 91/376 R |
| 5,096,267 | 3/1992 | Volz | 91/376 R |
| 5,233,907 | 8/1993 | Gautier et al. | |

FOREIGN PATENT DOCUMENTS

94/06660  3/1994  WIPO .

*Primary Examiner*—F. Daniel Lopez
*Attorney, Agent, or Firm*—Burns, Doane, Swecker & Mathis, LLP

[57] ABSTRACT

The present invention is directed to a vacuum servo unit which is characterized in that the negative pressure controlling valve seat is arranged in a position spaced from the atmosphere controlling valve seat in an axial direction, and the atmosphere and the negative pressure controlling seal portions of the control valve are spaced in the axial direction to cooperate with the atmosphere and the negative pressure controlling valve seats. The control valve is in air tightly engagement with an internal surface of the movable power piston at an external surface thereof, and the control valve has a path provided between the atmosphere controlling seal portion and the negative pressure controlling seal portion. Accordingly, when the brake operating member is operated, large quantities of the atmosphere can be introduced to the variable pressure chamber through the clearance between the atmosphere controlling valve seat and the atmosphere controlling seal portion. Therefore, the operation response of the vacuum servo unit can be improved.

18 Claims, 8 Drawing Sheets

VACUUM SERVO UNIT FOR A VEHICLE BRAKING SYSTEM

BACKGROUND OF THE INVENTION

1. Field of the Invention

The present invention relates to a vacuum servo unit for a vehicle braking system.

2. Description of the Related Art

Vacuum servo units for reducing the operating input force to be applied when a vehicle braking system is started have generally been used for some time. For example, a vacuum servo unit is disclosed in U.S. Pat. No. 5,233,907. In the vacuum servo unit disclosed in the '907 patent, a valve mechanism (136, 138, 140) is located outside the tubular part of the piston (22) while the plunger (32) is located inside the tubular part of the piston. The plunger is further provided with a cylindrical portion having an annular portion (134) in order to work together with the valve mechanism. Because of this structure, the vacuum servo unit disclosed in the '907 patent is very complicated in structure and includes many parts.

SUMMARY OF THE INVENTION

Accordingly, a need exists for a vacuum servo unit that is able to obviate the aforementioned drawbacks associated with the conventional vacuum servo unit. That is, a need exists for a vacuum servo unit which has a simple structure, is relatively low in cost, is easily made, and whose response time is decreased.

In light of the foregoing, an aspect of the present invention involves a vacuum servo unit for a vehicle braking system that has a housing in which is defined a pressure chamber, a movable wall member provided in the housing to divide the pressure chamber into a constant pressure chamber adapted to communicate with a negative pressure source and a variable pressure chamber adapted to selectively communicate with the atmosphere or with the negative pressure source, and a movable power piston integrally connected with the movable wall member. A valve plunger is provided in the movable power piston and is axially movable. An input rod is connected with a brake operation member at a first end thereof and is connected with the valve plunger at a second end thereof. An output member outputs a propulsion force on the movable power piston accompanying a movement of the movable wall to outside said unit. An atmosphere controlling valve seat is formed on the valve plunger. A negative pressure controlling valve seat is formed in the movable power piston. A control valve has an atmosphere controlling seal portion to cooperate with the atmosphere controlling valve seat for controlling a communication of the variable pressure chamber with the atmospheric air, and a negative pressure controlling seal portion to cooperate with the negative pressure controlling valve seat for controlling a communication between the variable pressure chamber and the negative pressure chamber. The negative pressure controlling valve seat is arranged in a position spaced from the atmosphere controlling valve seat in an axial direction. The atmosphere and the negative pressure controlling seal portion of the control valve are spaced in the axial direction to cooperate with the atmosphere and the negative pressure controlling valve seat. The control valve is in air tight engagement with an internal surface of the movable power piston at an external surface thereof. The control valve has a path provided between the atmosphere controlling seal portion and the negative pressure controlling seal portion for allowing communication between the variable pressure chamber and the constant pressure chamber when the negative pressure controlling valve seat is out of engagement with the negative pressure controlling seal portion and allowing communication between the variable pressure chamber and the atmosphere when the atmosphere controlling valve seat is out of engagement with the atmosphere controlling seal portion.

In the foregoing vacuum servo unit, when the brake operation member, for example a brake pedal, is operated, the input rod is moved towards the inside of the movable power piston. According to the movement of the input rod, the valve plunger also moves towards the output side in the power piston, and the control valve cooperates with the valve plunger to move towards the output side. Therefore, the negative pressure controlling seal portion contacts with the negative pressure controlling valve seat, which cuts off the communication between the constant pressure chamber and the variable pressure chamber. After the negative pressure controlling seal portion contacts with the negative pressure controlling valve seat, the atmosphere controlling valve seat brakes away from the atmosphere controlling seal portion, and atmospheric air is introduced to the variable pressure chamber through the clearance between the atmosphere controlling valve seat and the atmosphere controlling seal portion. Accordingly, the difference pressure is produced between the constant pressure chamber and the variable pressure chamber, which generates the propulsion force on the movable power piston.

According to the vacuum servo unit as structured above, the negative pressure controlling valve seat is arranged in a position spaced from the atmosphere controlling valve seat in an axial direction and the atmosphere and the negative pressure controlling seal portions of the control valve are spaced in the axial direction to cooperate with the atmosphere and the negative pressure controlling valve seats, so that it is possible to make the diameter of the atmosphere controlling valve seat enlarged thoroughly. And an atmosphere path area of an air path formed between the atmosphere controlling valve seat and the atmosphere controlling seal portion can be secured fully. Therefore, the inflow amount of the atmosphere which is introduced to the variable pressure chamber is increased according to the enlargement of the area of the atmosphere path formed between the atmosphere controlling valve seat and the atmosphere controlling seal portion, and it is possible to improve the operation response of the vacuum servo unit in the operation condition.

BRIEF DESCRIPTION OF THE DRAWINGS

The foregoing and other features will become more readily apparent from the following description considered with reference to the accompanying drawing figures in which like elements are designated by like reference numerals and wherein.

DETAILED DESCRIPTION OF THE PREFERRED EMBODIMENTS

Figure 1:
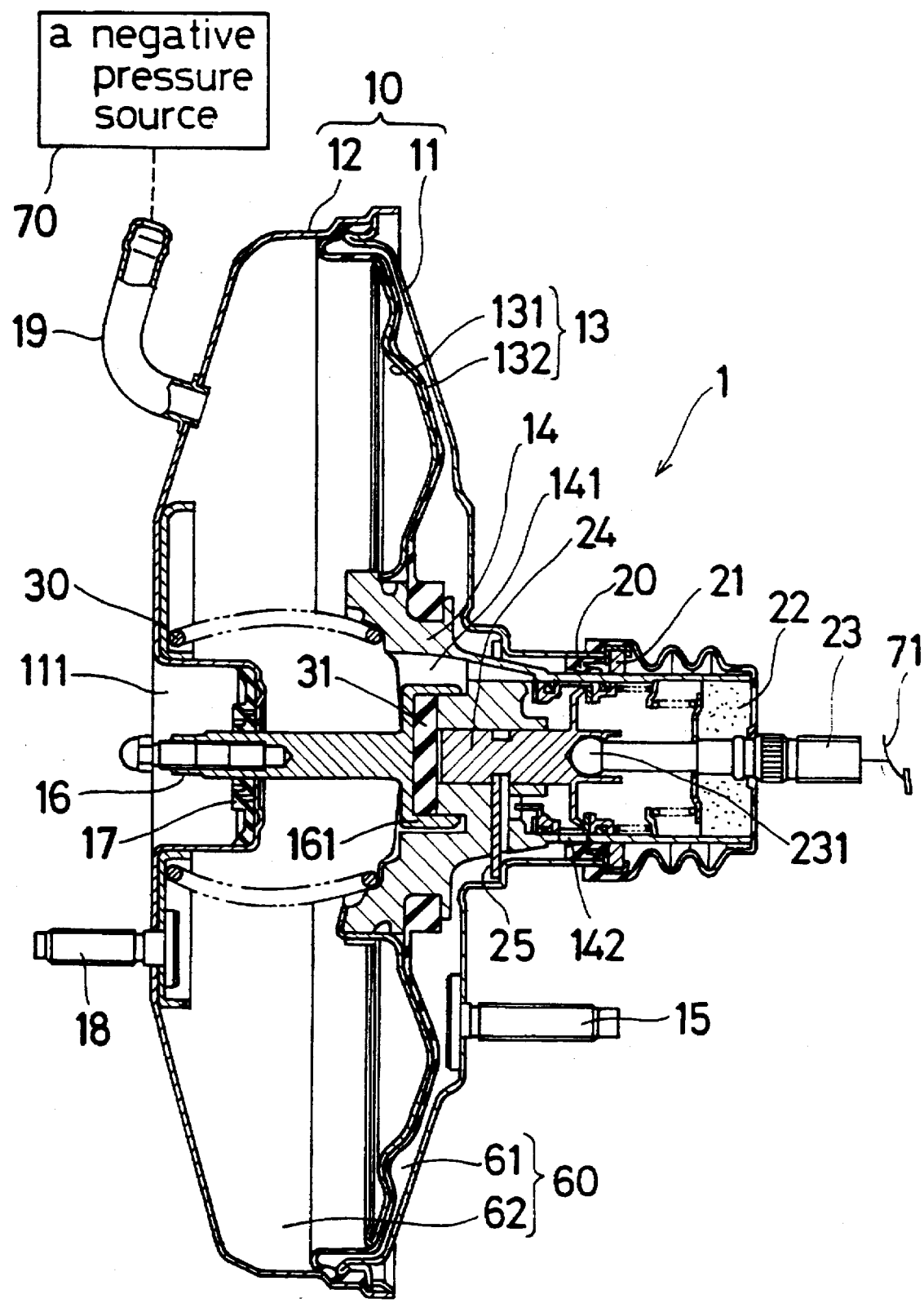
FIG. 1 is a cross-sectional view of a vacuum servo unit according to a first embodiment of the present invention.

Referring to FIG. 1, there is illustrated a vacuum servo unit according to a first embodiment of the present invention. In FIG. 1, a vacuum servo unit 1 has a housing 10. The housing 10 is composed of a first shell 11 and a second shell 12. An edge of the first shell 11 is inserted into the inside of the second shell 12 in an air tight manner.

A pressure chamber 60 is formed between the first shell 11 and the second shell 12.

A movable wall member 13 is provided in the pressure chamber 60. The inside of the pressure chamber 60 is divided into a variable pressure chamber 61 and a constant pressure chamber 62 by the movable wall member 13. The movable wall member 13 includes an annular plate 131 and a diaphragm 132. The inner peripheral portion of the annular plate 131 and the inner peripheral portion of the diaphragm 132 are in air tight engagement with the outer peripheral portion of a movable power piston 14. An outer peripheral portion of the diaphragm 132 is sandwiched in an air tight manner between the annular plate 131 and the first shell 11 and is fixed between the first shell 11 and the second shell 12.

The movable power piston 14 has a first air path 141 and a second air path 142. The first air pass communicates the inside of the movable power piston 14 with the constant pressure chamber 62. The second air pass communicates the variable pressure chamber 61 with the inside of the movable power piston 14.

A plurality of bolts 15 are fixed on the first shell 11. The first shell 11 is fixed to the dashboard (not shown) by the bolts 15.

The recess 111 for fixing the master cylinder (not shown) is formed on the second shell 12. A seat member 17 for sealing between the second shell 12 and an output rod 16 is fixed in the recess 111.

A reinforcing plate is fixed in the inside of the second shell 12, and a plurality of bolts 18 for fixing the master cylinder (not shown) are fixed to the reinforcing plate.

A connector 19 for connecting the constant pressure chamber 62 with a negative pressure source 70, is fixed to the second shell 12. An example of a negative pressure source is an intake manifold of an internal combustion engine.

An annular seal member 20 and a bushing 21 are respectively provided between the first shell 11 and the movable power piston 14. The movable power piston 14 is supported by the annular seal member 20 and the bushing 21, and the movable power piston 14 is movable in the axial direction of the housing 10 within the annular seal member and bushing.

Inside the movable power piston 14, an air cleaner 22, an input rod 23, a valve plunger 24, and an output rod 16 are provided. The valve plunger 24 is movably provided in the movable power piston 14 and the axial movement of the valve plunger 24 is restricted by a key 25. A ball joint portion 231 is formed on one end of the input rod 23. The ball joint portion 231 is insert into the inside of the right end portion of the valve plunger 24 and fixed, so that the input rod 23 is supported by the valve plunger 24 so as to be capable of moving.

Figure 2:
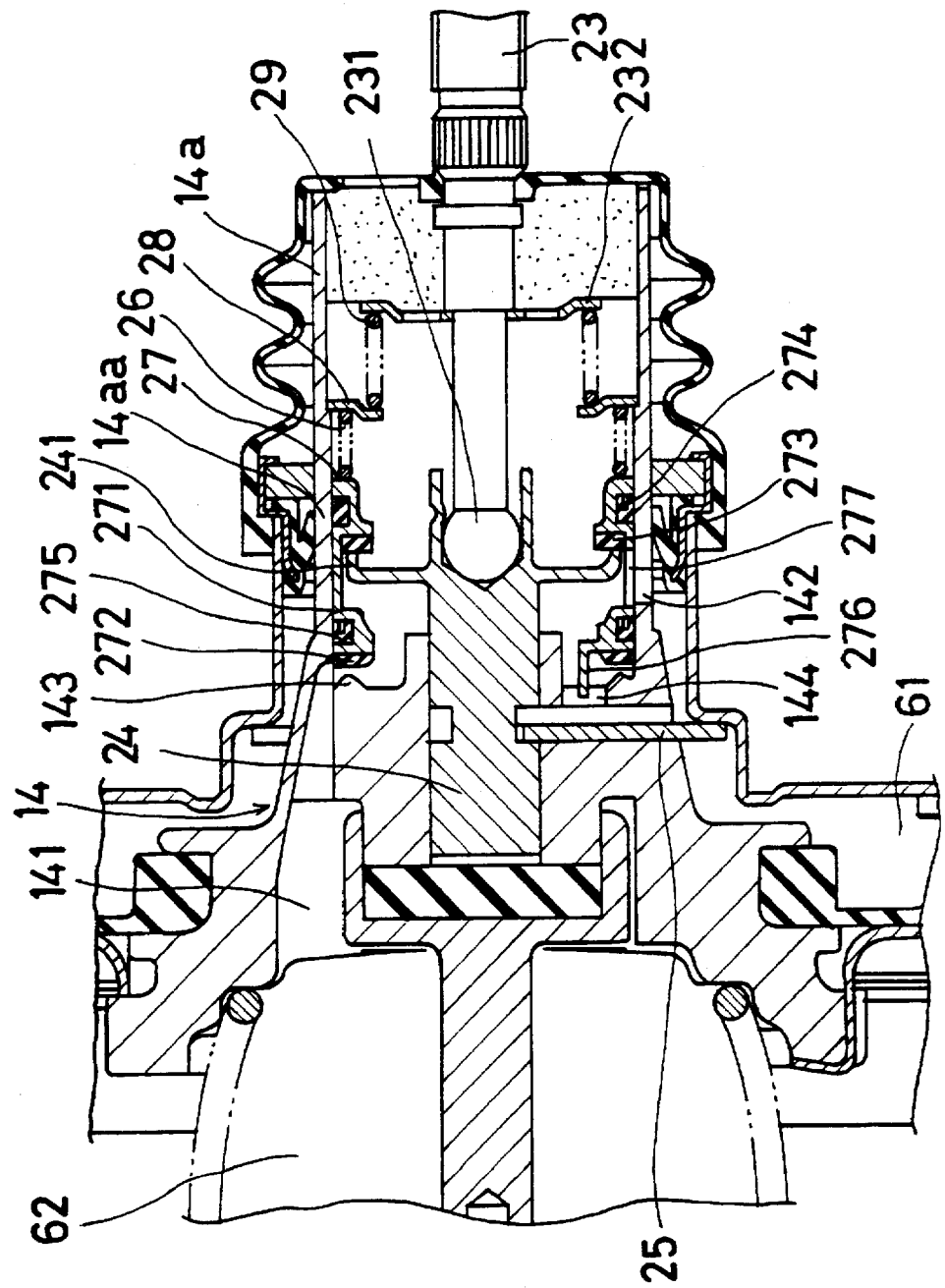
FIG. 2 is a partly enlarged cross-sectional view of the vacuum servo unit shown in FIG. 1.

As illustrated in FIG. 2, a control valve mechanism is provided around the connection between the input rod 23 and the valve plunger 24. The control valve mechanism includes a control valve 27 that is biased towards the valve plunger 24 by a spring 26, a negative pressure controlling valve seat 143 formed on the movable power piston 14, and an atmosphere controlling valve seat 241 extending towards the rear end portion of the movable power piston 14 and integrally formed on the right side of the valve plunger 24.

The negative pressure controlling valve seat 143 is arranged in a position spaced from the atmosphere controlling valve seat 241 in an axial direction, i.e., compared with the atmosphere controlling valve seat 241, the negative pressure controlling valve seat 143 is arranged closer to the output rod 16.

The control valve 27 has a cylindrical body 271. A negative pressure controlling seal portion 272 is provided on the left end portion of the cylindrical body 271. An atmosphere controlling seal portion 273 is provided on the inner peripheral side of the cylindrical body 271. Therefore, the negative pressure controlling seal portion 272 is arranged in a position spaced from the atmosphere controlling seal portion 273 in an axial direction, i.e., compared with the atmosphere controlling seal portion 273, the negative pressure controlling seal portion 272 is arranged closer to the output rod 16. The control valve 27 has seal members 274, 275 for providing air tight engagement with the inner peripheral surface of the movable power piston 14. The cylindrical body 271 includes a path 277 therethrough which is located between the negative pressure controlling seal portion 272 and the atmosphere controlling seal portion 273. The path 277 allows the communication between the variable pressure chamber 61 and the constant pressure chamber 62, and the path 277 is opposed to the second air path 142 of the movable power piston 14.

The movable power piston 14 has a rear cylindrical portion 14a extending outwardly from the housing 10. A diameter of the atmosphere controlling valve seat 143, a diameter of the negative pressure controlling valve seat 241, a diameter of the atmosphere controlling seat portion 273, and a diameter of the negative pressure controlling seal portion 272 are each equal to or less than a diameter of a portion 14aa of the rear cylindrical portion 14a of the movable power piston 14 in which the atmosphere controlling seal portion 273 of the control valve 27 is located.

The control valve 27 has a stopper 276 at the left end portion. The stopper 27 is located on the inner peripheral side of the negative pressure controlling seal portion 272.

A retainer 28 is provided in the inner peripheral portion of the movable power piston 14. A biasing spring 26 is provided between the retainer 28 and the control valve 27.

One end portion of a spring 29 for biasing the input rod 23 in the direction of the initial position, i.e., towards the right side, contacts the retainer 28. The other end portion of the spring 29 contacts a flange portion 232 of the input rod 23.

The movable power piston 14 has a hole 144 for engaging with the stopper 276. The hole 144 communicates with the variable pressure chamber 61 through the hole for installing the key 25.

In FIG. 1, a cup portion 161 is provided on a right end portion of the output rod 16. A reaction disk 31 is inserted into the inside of the cup portion 161. The output rod 16 is supported by a sealing member 17 secured with a holding means into the recess 111 so as to be movable. And the reaction disk 31 contacts an inner portion of the movable power piston 14.

A main spring 30 is provided between the movable power piston 14 and the second shell 12. The main spring 30 biases the movable power piston 14 towards the non-operating or initial position. The main spring 30 also fixes a plate spring in place which engages the cup 161 of the output rod 16 and biases the output rod 16 towards the power piston 14 side.

In the vacuum servo unit 1 according to the first embodiment of the invention, when the brake pedal 71 is operated, the input rod 23 is moved towards the inside of the movable power piston 14. According to the movement of the input rod 23, the valve plunger 24 also moves towards the left side in the power piston 14, and the control valve 27 cooperates with the valve plunger 24 to move towards the left side by the biasing force of the spring 26. Therefore, the negative pressure controlling seal portion 272 contacts the negative pressure controlling valve seat 143, which cuts off the communication between the constant pressure chamber 62 and the variable pressure chamber 61. After the negative pressure controlling seal portion 272 contacts the negative pressure controlling valve seat 143, the atmosphere controlling valve seat 241 brakes away from the atmosphere controlling seal portion 273. The atmospheric air is then allowed to pass into the variable pressure chamber 61 through the clearance between the atmosphere controlling valve seat 241 and the atmosphere controlling seal portion 273, the pass 277, the second air pass 142, the hole 144 for engaging with the stopper 276, and the hole for installing the key 25. Accordingly, a pressure difference is produced between the constant pressure chamber 62 and the variable pressure chamber 61, which generates a propulsive force on the movable power piston 14.

When the operation of the brake pedal 71 is ceased, the input rod 23 moves towards the outside of the movable power piston 14, i.e., the right side. The valve plunger 24 moves towards the right side in the movable power piston 14 accompanying the movement of the input rod 23. Therefore, the atmosphere controlling valve seat 241 contacts the atmosphere controlling seal portion 273, which cuts off the communication between the variable pressure chamber 61 and the atmosphere. The valve plunger member 24 then moves further towards the right side pushing the control valve 27 towards the right side. The negative pressure controlling seal portion 272 brakes away from the negative pressure controlling valve seat 143, which allows the variable pressure chamber 61 to communicate with the constant pressure chamber 62. The atmospheric air within the variable pressure chamber 61 flows into the constant pressure chamber 62 through the second air path 142, the path 277, the clearance between the negative pressure controlling valve seat 143 and the negative pressure controlling seal portion 272, the first air path 141, the hole 144 for engaging with the stopper 276, and the hole for installing the key 25. Therefore, the pressure difference between the variable pressure chamber 61 and the constant pressure chamber 62 is equalized and the movable power piston 14 is returned to the initial position by the biasing force of the spring 30.

The rotation of the control valve 27 with respect to the movable power piston 14 is limited because the stopper 276 is in engagement with the hole 144 provided on the movable power piston 14.

According to the first embodiment of the present invention, the negative pressure controlling valve seat 143 is arranged in a position spaced from the atmosphere controlling valve seat 241 in an axial direction and the atmosphere and the negative pressure controlling seal portions 273, 272 of the control valve 27 are spaced in the axial direction to cooperate with the atmosphere and the negative pressure controlling valve seats 241, 143. It is possible to make the diameter of the atmosphere controlling valve seat 241 up to as large as the inner diameter of the portion 14aa of the movable power piston 14. An atmosphere path area of an air path formed between the atmosphere controlling valve seat 241 and the atmosphere controlling seal portion 273 is secured fully because the diameter of the atmosphere controlling valve seat 241, the diameter of the negative pressure controlling valve seat 143, the diameter of the atmosphere controlling seal portion 273, and the diameter of the negative pressure controlling seal portion 272 are provided within an inner diameter of the portion 14aa of the movable power piston 14 in which the atmosphere controlling seal portion 273 of the control valve 27 is located. Therefore, the inflow amount of the atmosphere which is introduced into the variable pressure chamber 61 may be increased by enlargement of the area of the atmosphere path formed between the atmosphere controlling valve seat 241 and the atmosphere controlling seal portion 273. It is possible to improve the response of the vacuum servo unit 1 in an operating condition by varying the area of the atmosphere path.

Moreover, because the path 277 is arranged in the very neighborhood of the atmosphere path formed between the atmosphere controlling valve seat 241 and the atmosphere controlling seal portion 273, and because the second air path 142 is arranged near the path 277, the atmosphere can flow into the variable pressure chamber 61 immediately. Thus, it is possible to further improve the response of the vacuum servo unit 1 in the operating condition.

The operation is further improved because the hole 144 for engaging with the stopper 276 is in communication with the variable pressure chamber 61, the atmosphere can flow into the variable pressure chamber 61, or the atmosphere can flow from the variable pressure chamber 61 to the constant pressure chamber 62 when the atmosphere controlling valve seat 241 brakes away from the atmosphere controlling seal portion 273, or the negative pressure controlling seal portion 272 brakes away from the negative pressure controlling valve seat 143.

Since the rotation of the control valve 27 with respect to the movable power piston 14 is limited, the second air path 142 is maintained about opposite to the path 277.

As mentioned above, in the vacuum servo unit according to the present invention, it is possible to decrease the number of components of the vacuum servo unit and the assembly of the unit is simplified, so that it is possible to supply a vacuum servo unit at low cost and having a lower response time.

In the first embodiment described above, the vacuum servo unit is single-type vacuum servo unit, however, the same action and effect can be achieved in a tandem-type vacuum servo unit.

In addition, a substantially cylindrical body 271 has been described, however, a plurality of fine connecting rods, or a cylindrical body with a path at one part can be used in place of the substantially cylindrical body 271.

Figure 3:
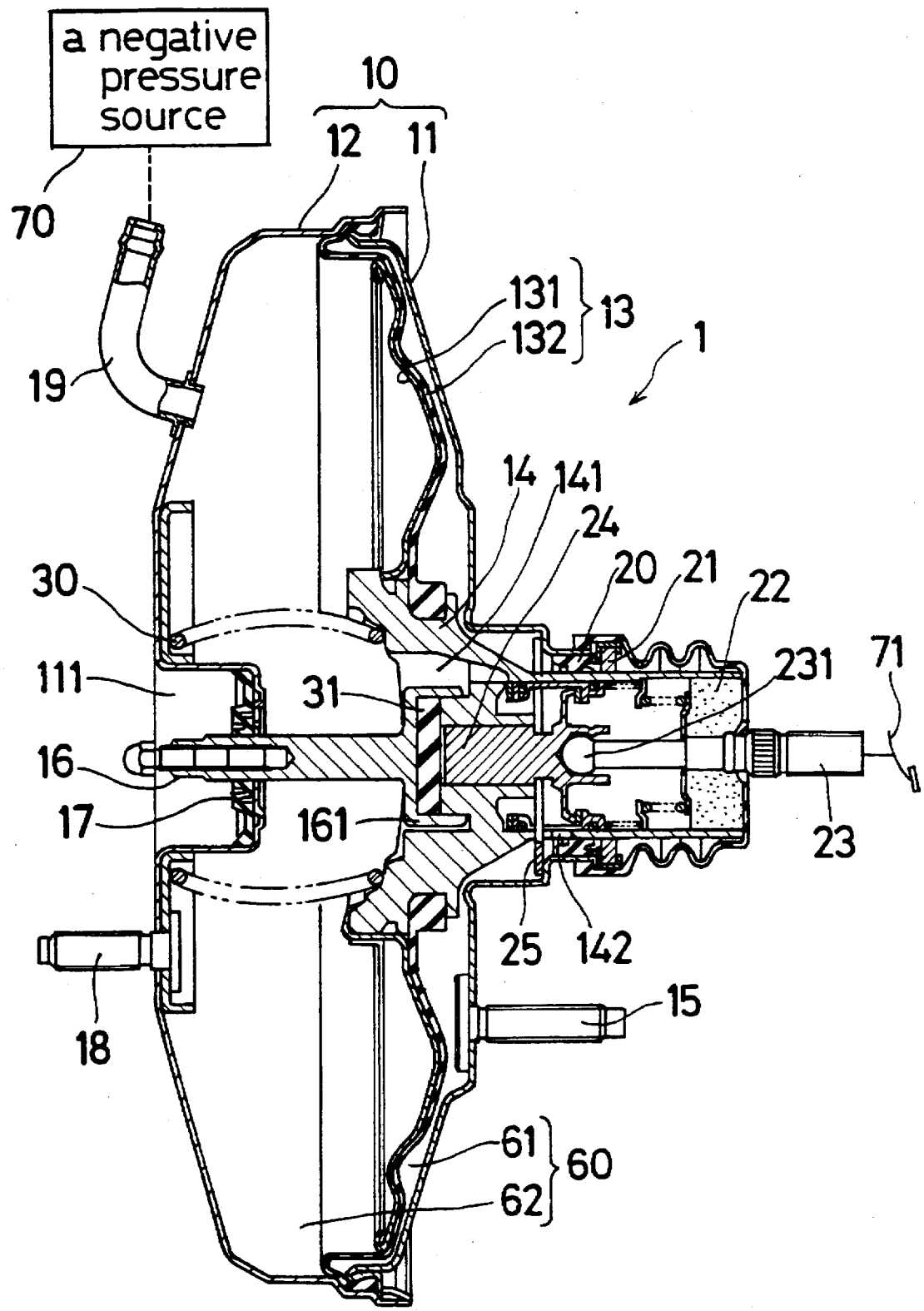
FIG. 3 is a cross-sectional view of a vacuum servo unit according to a second embodiment of the present invention.
Figure 4:
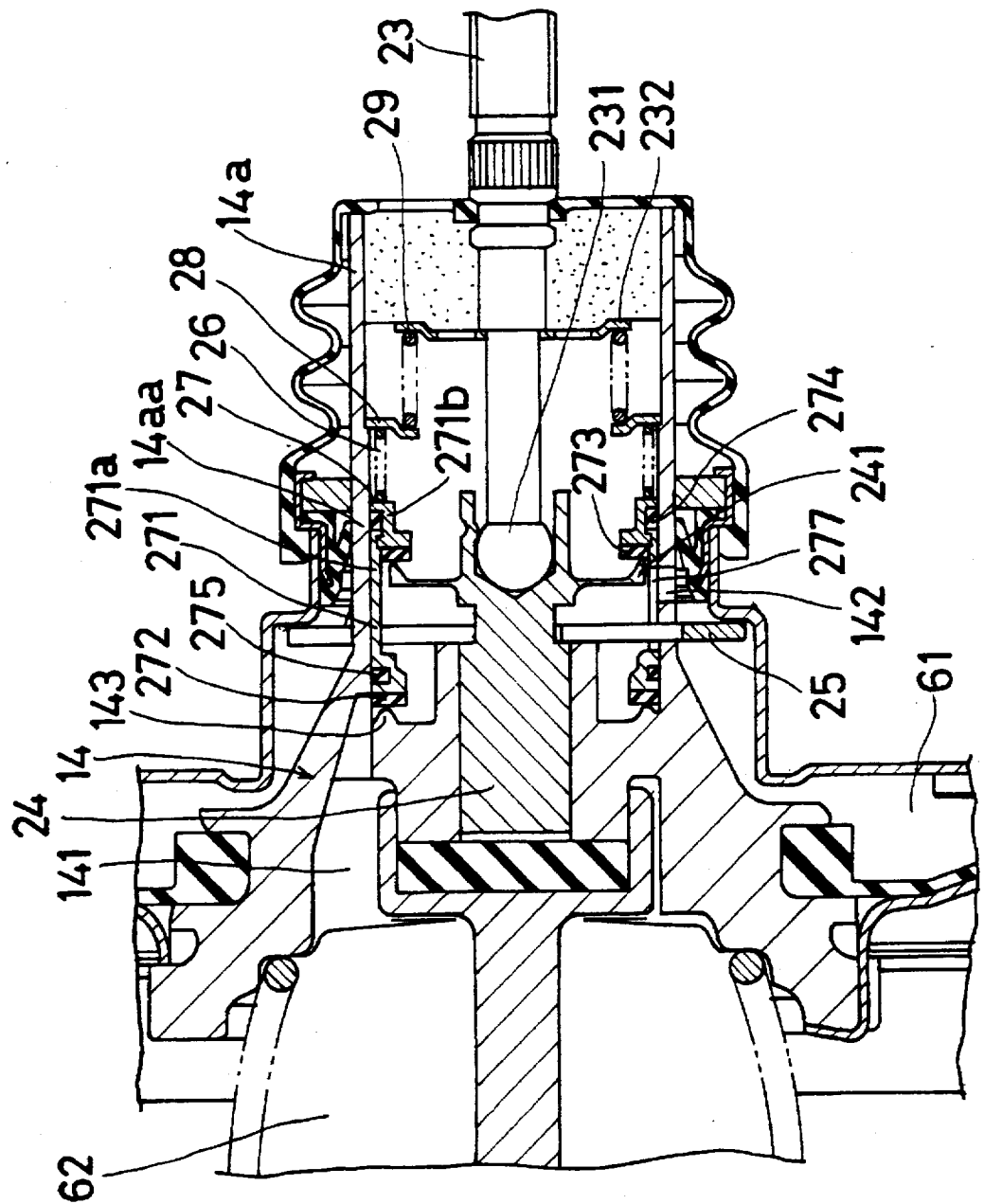
FIG. 4 is a partly enlarged cross-sectional view of the vacuum servo unit shown in FIG. 3.

FIGS. 3 and 4 illustrate a second embodiment of the present invention, wherein the components similar to those in the first embodiment are identified with the same reference numbers. The following description will focus primarily on the differences between the second embodiment and the first embodiment which has been described above.

In FIG. 3 and FIG. 4, a control valve mechanism is located at the connection between the input rod 23 and the valve plunger 24. The control valve mechanism includes a control valve 27 that is biased towards the valve plunger 24 by a spring 26, a negative pressure controlling valve seat 143 formed on the movable power piston 14, and an atmosphere controlling valve seat 241 integrally formed on the right side of the plunger member The negative pressure controlling valve seat 143 is arranged in a position spaced from the atmosphere controlling valve seat 241 in an axial direction, i.e., compared with the atmosphere controlling valve seat 241, the negative pressure controlling valve seat 143 is arranged closer to the output rod 16 in the normal condition.

The control valve 27 has a substantially cylindrical body 271. Substantially cylindrical body 271 comprises a first substantially cylindrical body 271a and a second substantially cylindrical body 271b. A negative pressure controlling seal portion 272 is provided on the left end of the first substantially cylindrical body 271a. An atmosphere controlling seal portion 273 is provided on the left end of the second substantially cylindrical body 271b. Therefore, the negative pressure controlling seal portion 272 is arranged in a position spaced from the atmosphere controlling seal portion 273 in an axial direction, i.e., compared with the atmosphere controlling seal portion 273, the negative pressure controlling seal portion 272 is arranged closer to the output rod 16. The first substantially cylindrical body 271a has a seal member 275 for forming an air tight engagement with the inner peripheral surface of the movable power piston 14 at the outer peripheral portion thereof. The second substantially cylindrical body 271b has a seal member 274 for forming an air tight engagement with the inner peripheral surface of the movable power piston 14 at the outer peripheral portion thereof. The first substantially cylindrical body 271a includes an opening which forms a path 277 located between the negative pressure controlling seal portion 272 and the atmosphere controlling seal portion 273. The path 277 allows communication between the variable pressure chamber 61 and the constant pressure chamber 62. The path 277 is adjacent to the second air path 142 of the movable power piston 14 and a hole in the key 25.

The left end portion of the second substantially cylindrical body 271b is engaged in an air tight manner with an annular protrusion formed on the inner peripheral portion of the right end of the first substantially cylindrical body 271a. Therefore, the first substantially cylindrical body 271a is integrally connecting with the second substantially cylindrical body 271b.

The movable power piston 14 has a rear cylindrical portion 14a extending outwardly from the housing 10. A diameter of the atmosphere controlling valve seat 143, a diameter of the negative pressure controlling valve seat 241, a diameter of the atmosphere controlling seal portion 273, and a diameter of the negative pressure controlling seal portion 272 are less than or equal to a diameter of the portion 14aa of the rear cylindrical portion 14a of the movable power piston 14.

According to the second embodiment of the present invention, the key 25 pierces the movable power piston 14 and the control valve 27 through a hole in the movable power piston 14 provided for receiving the key 25 and through the path 277 of the control valve 27. One end of the key 25 is installed in a groove in the valve plunger 24. The key 25 determines the amount of axial movement of the valve plunger 24 within the movable power piston 14. The control valve 27 is in engagement with the key 25, which limits the rotation of the control valve 27 with respect to the movable power piston 14.

A retainer 28 is provided in the inner peripheral portion of the movable power piston 14. A biasing sprig 26 is provided between the retainer 28 and the control valve 27.

One end portion of a spring 29 for biasing the input rod 23 in the direction that initial portion, i.e. towards the right side, contacts the retainer 28. The other end portion of the spring 29 contacts a flange portion 232 provided on the input rod 23.

In this vacuum servo unit 1 of FIGS. 3 and 4, when the brake pedal 71 is operated, the input rod 23 is moved towards the inside of the movable power piston 14. According to the movement of the input rod 23, the valve plunger 24 moves towards the left side within the power piston 14, and the control valve 27 cooperates with the valve plunger 24 to move towards the left side by the biasing force of the spring 26. Therefore, the negative pressure controlling seal portion 272 contacts with the negative pressure controlling valve seat 143, which cuts off the communication between the constant pressure chamber 62 and the variable pressure chamber 61. After the negative pressure controlling seal portion 272 contacts with the negative pressure controlling valve seat 143, the atmosphere controlling valve seat 241 brakes away from the atmosphere controlling seal portion 273, and the atmosphere is introduced to the variable pressure chamber 61 through the path 277, the second air path 142, and the hole for installing the key 25. Accordingly, a difference in pressure is produced between the constant pressure chamber 62 and the variable pressure chamber 61, which generates the propulsive force on the movable power piston 14.

When the operation of the brake pedal 71 ceases, the input rod 23 moves towards the outside of the movable power piston 14, i.e., the right side. The valve plunger 24 moves towards the right side in the movable power piston 14 accompanying the movement of the input rod 23. The atmosphere controlling valve seat 241 contacts the atmosphere controlling seal portion 273, which cuts off the communication between the variable pressure chamber 61 and the atmosphere. The valve plunger 24 then moves further towards the right side, and the control valve 27 is pushed towards the right side in cooperation with the valve plunger 24. Accordingly, the negative pressure controlling seal portion 272 brakes away from the negative pressure controlling valve seat 143, which allows communication between the variable pressure chamber 61 and the constant pressure chamber 62. The atmospheric air in the variable pressure chamber 61 flows into the constant pressure chamber 62 through the second air path 142, the path 277, the clearance between the negative pressure controlling valve seat 143 and the negative pressure controlling seal portion 272, the hole for installing the key 25, and the first path 141. Therefore, the pressure in the variable pressure chamber 61 and the constant pressure chamber 62 is equalized and the movable power piston 14 is returned to the initial position by the biasing force of the spring 30.

Accordingly, in the second embodiment discussed above, the hole for installing the key 25 is used as a path which the atmospheric air passes through because the hole for installing the key 25 communicates with the variable pressure chamber 61. The atmospheric air can flow into the variable pressure chamber 61, or the atmospheric air can flow from the variable pressure chamber 61 to the constant pressure chamber 62 promptly when the atmosphere controlling valve seat 241 brakes away from the atmosphere controlling seal portion 273 or when the negative pressure controlling seal portion 272 brakes away from the negative pressure controlling valve seat 143. This makes it possible to further improve the response of the vacuum servo unit 1 in the operating condition.

The rotation of the control valve 27 with respect to the movable power piston 14 is limited by the key 25, and thus, the second air path 142 is about opposite to the air path 277, and the second air path 142 is maintained about opposite to the hole for installing the key 25.

In the second embodiment discussed above, the vacuum servo unit is a single-type vacuum servo unit, however, the same action and effect can be gained in a tandem-type vacuum servo unit.

In addition, a substantially cylindrical body 271 has been described, however, a plurality of the fine connecting rods, or a cylindrical body with a path in one part can be used in place of the substantially cylindrical body 271.

The seal members 274, 275 are illustrated as seal members having circular cross-sections, however, cup-type seal members that allow the control valve to slide into the movable power piston, or diaphragm-type seal members can also be applied to this vacuum servo unit.

The other actions and effects of the second embodiment are similar to those discussed with respect to the first embodiment and therefore, their explanation has been omitted.

Figure 5:
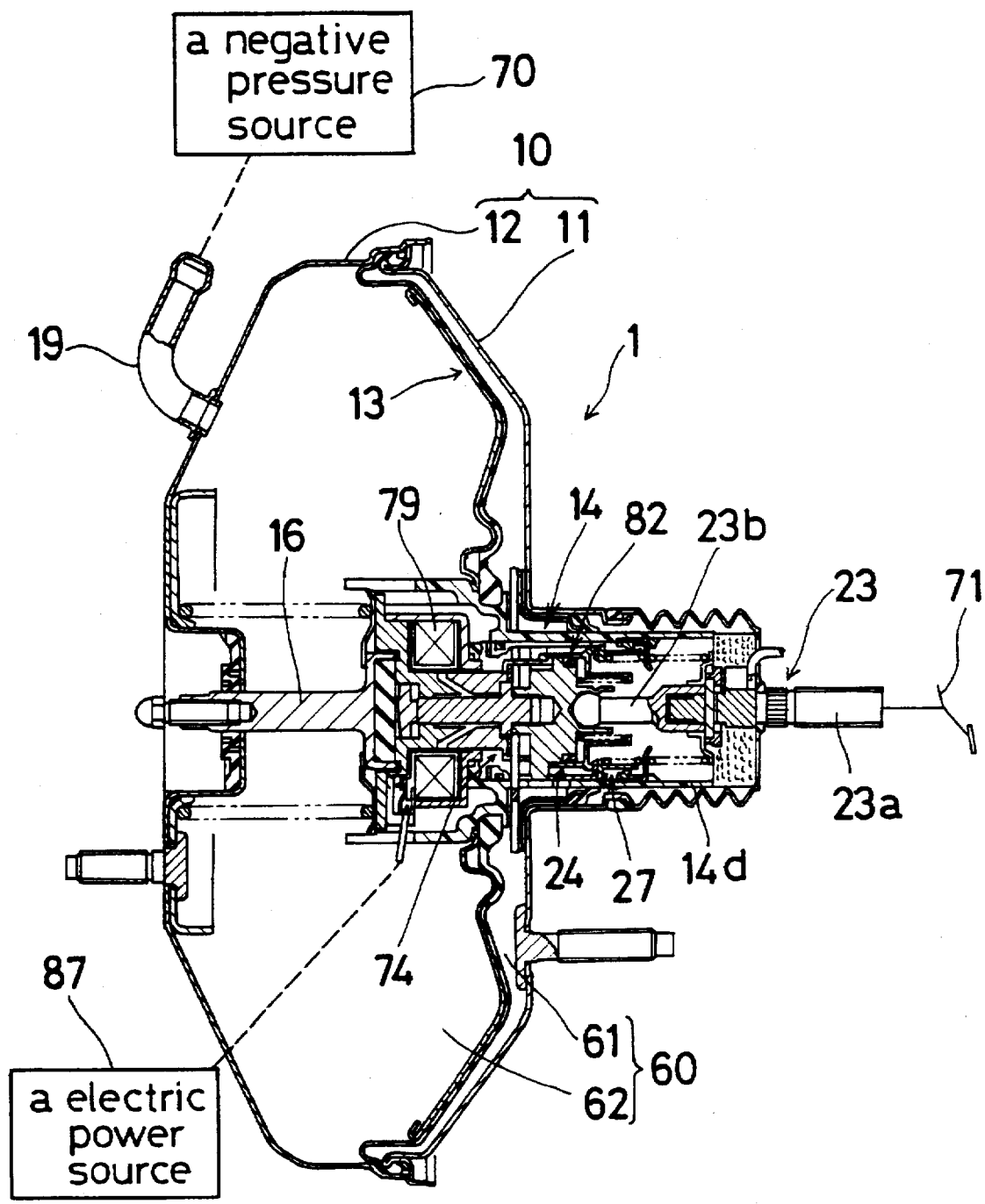
FIG. 5 is a cross-sectional view of a vacuum servo unit according to a third embodiment of the present invention.
Figure 6:
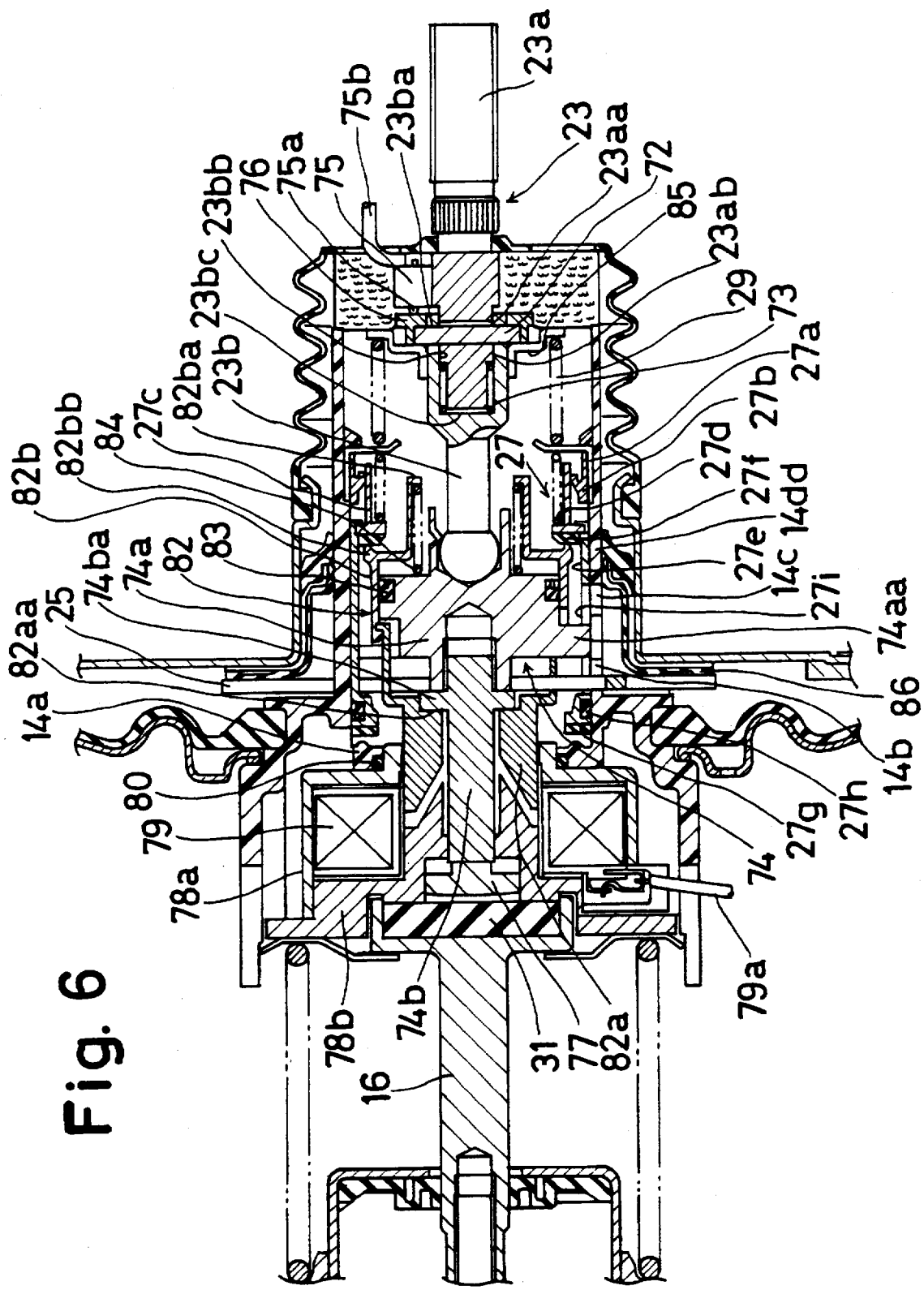
FIG. 6 is a partly enlarged cross-sectional view of the vacuum servo unit shown in FIG. 5.
Figure 7:
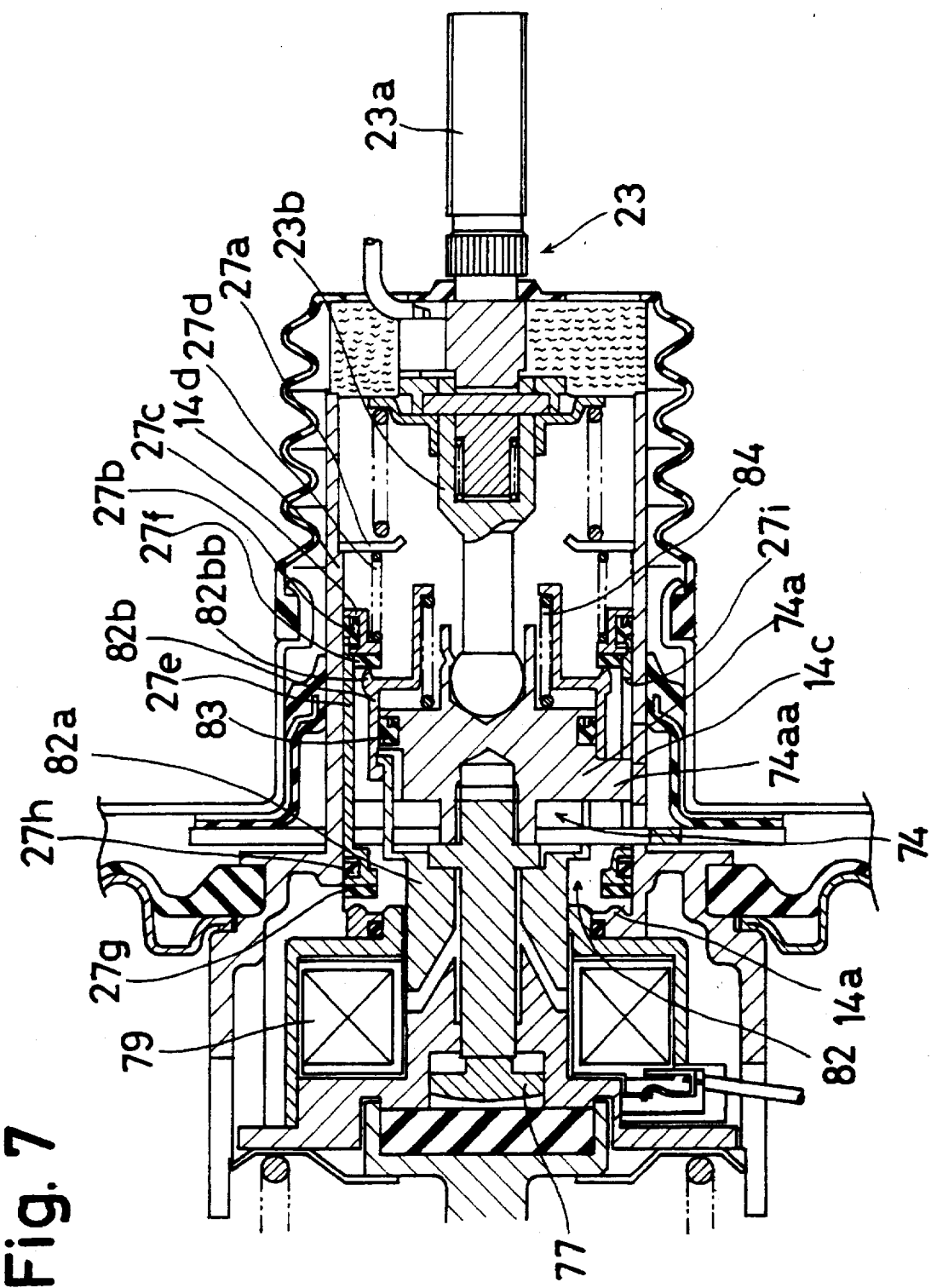
FIG. 7 is a cross-sectional view of a vacuum servo unit according to a fourth embodiment of the present invention.

FIGS. 5 and 6 illustrate a third embodiment of the present invention, wherein the elements which are similar to the first embodiment are assigned the same numbers. FIG. 7 illustrates a fourth embodiment which is similar to the third embodiment.

In FIG. 6 and FIG. 7, an automatically operable vacuum servo unit 1 has a housing 10 that defines a pressure chamber 60. In the housing 10, a movable wall member 13 is fixed in an air tight manner at an outer peripheral portion to the inside of the housing 10 so as to be movable in an axial direction. The pressure chamber 60 in the housing 10 is divided in an air tight manner into a constant negative pressure chamber 62 and a variable pressure chamber 61. These chambers 61, 62 are divided by way of the movable wall member 13. The constant pressure chamber 62 is adapted to communicate, through a connector 19, with a negative pressure source 70, such as an intake manifold of an internal combustion engine.

A movable power piston 14 made of a resin is inserted in the housing 10 from the rear portion of the housing 10 and the inner peripheral portion of the movable wall member 13 is connected in an airtight manner with the movable power piston 14.

An input rod 23 includes a first input rod 23a and a second input rod 23b. The first input rod 23a has a right end portion shown in FIG. 6 that is connected with a brake operating member, for example, a brake pedal 71. The first input rod 23a is inserted in the movable power piston An axially extending slit 23aa is formed in the first input rod 23a, and an axially movable connecting pin member 72 is inserted in the slit 23aa. The connecting pin member 72 is fixed to a hole 23ba formed with the second input member 23b so as to be immovable relative to the second input rod 23b.

The left side portion of the first input rod 23a is inserted into a hollow 23bb formed in the right side portion of the second input rod 23b, and the outer peripheral portion of the left side portion of the first input rod 23a contacts the inner peripheral portion of the right side portion of the second input rod 23b. A spring 73 is provided between the surface of a large diameter portion of the left side portion of the first input rod 23a and the bottom 23bc of the hollow 23bb to bias the first input rod 23a and the second input rod 23b away from each other. The second input rod 23b is connected with the input portion 74a of the first input member 74 so that the two are capable of moving as one body.

A micro switch 75 such as an electric switch member is fixed to an upper portion of the first input rod 23a. The micro switch 75 has an operative portion 75a as seen in FIG. 6 which transmits an electric signal during operation and a cord 75b to transmit the electric signal outside of the vacuum servo unit. A contact member 76, such as a switch member, is fixed to the connecting pin member 72 so as to be capable of contacting the operative portion 75a of the micro switch 75.

The valve plunger 24 includes the first input member 74, the second input member 77, and the plunger member 82.

The first input member 74 includes the input portion 74a and an output portion 74b. The output portion 74b of the input member 74 is fixed to the input portion 74a of the input member 74, and a second input member 77 contacts the output portion 74b of the input member 74, and all play a role in transmitting the brake operating force from the first input member 74 to a reaction disc 31 such as a reaction member. An output rod 16 such as the output member contacting the reaction disc 31 moves to operate a master cylinder piston (not shown) when the output rod 16 receives the brake operation force through the reaction disc 31.

An electronic solenoid 79 constituting a solenoid valve is fixed in a first fixed member 78a made of iron. The first fixed member 78a is fixed in an air tight manner to the movable power piston 14 through a seal member 80. A second fixed member 78b also made of an iron is located in the first fixed member 78a.

The solenoid 79 is connected to an electric power source 87 of the vehicle by a cord 79a and is adapted to generate an electromagnetic force by the supply of electric power from the electric power source 87 through the cord 79a.

A plunger member 82 forming part of the solenoid valve 79 includes a first plunger portion 82a and a second plunger portion 82b for the purposes of assembly. The first plunger portion 82a and the second plunger portion 82b are fixed to each other. The plunger member 82 is in air tight engagement with the input portion 74a of the first input member 74 at an inner peripheral portion of the second plunger portion 82b through a seal member 83, and is movable relative to the input portion 74a.

A spring 84 is provided between the input portion 74a of the input member 74 and an inner flange portion 82ba formed in the second plunger portion 82b. A flange portion 74ba is formed at the output portion 74b of the first input member 74 and is in engagement with a shoulder portion 82aa formed in the first plunger portion 82a.

Therefore, in a non-operating state of the second input rod 23b, the plunger member 82 is biased towards the right in FIG. 6 by the spring 84 and is kept in a stationary state by the engagement of the first plunger portion 82a and the flange portion 74ba.

A spring retainer 85 that receives a return spring 29 fixes the connect pin member 72 in place. The first retainer 27a that forms a control valve member 27 is fixed in the movable power piston 14 and receives the resilience from the second input rod 23b through the spring retainer 85 and the return spring 29. An outer peripheral portion of a seal member 27b is in engagement with the first retainer 27a and an inner peripheral portion of the seal member 27b has a seal function with a spring retainer 27c. A valve spring 27d is provided between the first retainer 27a and the spring retainer 27c. A valve plate 27e, such as a connection portion, extending towards the output rod 16 side is fixed in the spring retainer 27c. An atmosphere controlling seal portion 27f and a negative pressure controlling seal portion 27g are fixed respectively to the spring retainer 27c and the valve plate 27e so as to be formed integrally. Therefore, the negative pressure controlling seal portion 27g is arranged in a position spaced from the atmosphere controlling seal portion 27f in an axial direction, i.e., compared with the atmosphere controlling seal portion 27f, the negative pressure controlling seal portion 27g is arranged closer to the output rod 16. Seal member 27h is provided on the valve plate 27e for sealing between the movable power piston 14 and the valve plate 27e.

A radial projection 74aa is provided on the input portion 74a of the input member 74. The radial projection 74aa is in contact with the inner peripheral portion of the movable power piston 14 through the second plunger portion 82b and the valve plate 27e so as to move within the movable power piston 14.

By virtue of the aforementioned construction, the atmosphere controlling seal portion 27f is in engagement with the atmosphere controlling valve seat 82bb provided on the second plunger portion 82b in a non-operational state of the second input-rod 23b. In an operational state of the second input rod 23b, the negative pressure controlling seal portion 27g engages a negative pressure controlling valve seat 14a formed on the movable power piston 14. A key 25 is inserted into a stopper groove 14b provided in the power piston 14 and contacts the housing 10 through a damper member 86. The negative pressure controlling valve seat 14a is arranged in a position spaced from the atmosphere controlling valve seat 82bb in an axial direction, i.e., compared with the atmosphere controlling valve seat 82bb, the negative pressure controlling valve seat 14a is arranged closer to the output rod 16.

The movable power piston 14 has a rear cylindrical portion 14d extending outwardly from the housing 10. A diameter of the atmosphere controlling valve seat 82bb, a diameter of the negative pressure controlling valve seat 14a, a diameter of the atmosphere controlling seal portion 27f, and a diameter of the negative pressure controlling seal portion 27g are less than or equal to a diameter of the portion 14da of the rear cylindrical portion 14d of the movable power piston 14 in which the atmosphere controlling seal portion 27f of the control valve 27 is located.

A path 27i which allows communication between the variable pressure chamber 61 and the constant pressure chamber 62 is provided in the valve plate 27e. An air path 14c allowing communication between the path 27i with the variable pressure chamber 61 is provided in the movable power piston 14. The air path 14c allows communication between the variable pressure chamber 61 and the constant pressure chamber 62 in cooperation with the path 27i of the control valve 27. With this configuration, the axial space from the atmosphere controlling seal portion 27f to the variable pressure chamber 61 can be reduced.

The operation of the vacuum servo unit 1 according to FIGS. 5 and 6 is as follows. In a situation where the brake operating member, such as the brake pedal 71 is not operated by the driver, i.e., in the state shown in FIG. 6, the atmosphere controlling seal portion 27f is in engagement with the atmosphere controlling valve seat 82bb of the second plunger member 82b and the negative pressure controlling seal portion 27g is out of engagement with the negative pressure controlling valve seat 14a of the movable power piston 14. Therefore, the variable pressure chamber 61 is in communication with the intake manifold of the internal combustion engine such as the negative pressure source 70 through the air path 14c, the path 27i, the clearance between the negative controlling valve seat 14a and the negative controlling seal portion 27g, the constant pressure chamber 62, and the connector 19.

When the brake operating member of the vehicle, for example the brake pedal 71, is actuated by the driver, the first input rod 23a connected with the brake pedal 71 receives the brake operating force and moves towards the left side in FIG. 6. The brake operating force applied to the first input rod 23a through the brake pedal 71 overcomes the preset biasing force of the spring 73, and the first input rod 23a and the second input rod 23b approach each other to reduce the clearance initially established between the two input rod 23a, 23b. When the left end portion of the first input rod 23a contacts the bottom portion 23bc, the clearance is completely eliminated. Thus, the first input rod 23a pushes the second input rod 23b towards the left side in FIG. 6 and the first input rod 23a and the second input rod 23b move integrally as one towards the left.

As the clearance between the first input rod 23a and the second input rod 23b is eliminated by the operation of the first input rod 23a, and the micro switch 75 fixed to the first input rod 23a moves towards the contact member 76 fixed to the second input rod 23b, the contact member 76 contacts the operative portion 75a. The contact member 76 pushes the operative portion 75a to operate the micro switch 75, and the micro switch 75 transmits the electric signal.

The plunger member 82 also is moved towards the left by the contact between the flange portion 74ba and the shoulder portion 82aa accompanying the movement of the first input rod 23a. Both the atmosphere controlling seal portion 27f and the negative pressure controlling seal portion 27g move towards the left with the plunger member 82 by the biasing force of the valve spring 27d. The negative pressure controlling seal portion 27g then contacts the negative pressure controlling valve seat 14a of the power piston 14, which cuts off the communication between the variable pressure chamber 61 and the constant pressure chamber 62. Therefore, the communication between the variable pressure chamber 61 and the negative pressure source 70 is cut off.

As the plunger member 82 moves further towards the left in FIG. 6, the engagement between the atmosphere controlling seal portion 27f and the atmosphere controlling valve seat 82bb of the plunger member 82 ceases so that the variable pressure chamber 61 communicates with the atmosphere through the clearance between the atmosphere controlling seal portion 27f and the atmosphere controlling valve seat 82bb, the path 27i, and the air path 14c. Therefore, a pressure differential is generated between the constant pressure chamber 62 and the variable pressure chamber 61 by the inflow of the atmospheric air into the variable pressure chamber 61. The movable wall member 13 receives the load force created by the difference in pressure, and the movable power piston 14 connected with the movable wall member 13 applies the amplified brake force to the output rod 16 through the reaction disc 31. After this, either the atmosphere controlling seal portion 27f and the atmosphere controlling valve seat 82bb of the plunger member 82 are in an engaged state or the negative pressure controlling seal portion 27g and the negative controlling valve seat 14a are in an engaged state, depending on the reaction force that the second input rod 23b and the first input rod 23a receives from the reaction disc 31 through the second input member 77 and the first input member 74. The servo force of the vacuum servo unit 1 is controlled according to the driver's brake operating force applied to the first input rod 23a.

The existence of an urgent brake operation is determined when a micro computer (not shown) detects that the brake pedal has been operated faster than the pre-set value of the pedal stroke speed according to the pedal stroke value detected by a pedal stroke switch (not shown) provided on the brake pedal. The existence of an urgent brake operation is also determined when the existence of an obstacle is detected by a picture disposal of a CCD camera or a distance measuring sensor. When the first input rod 23a is operated by a brake force larger than the pre-set value and the brake pedal operation is detected by the micro switch 75, the necessity of the urgent brake operation is judged, and the solenoid 79 is supplied with electric power from the electric power source 87 through the cord 79a apart from the brake operation by the driver. The solenoid 79 supplied with the electric power generates an electromagnetic force to make the plunger member 82 move towards the left in FIG. 6 against the biasing force of the biasing spring 84 and the frictional resistance between the plunger member 82 and the seal member 83 irrespective of the operation of the first input rod 23a. Meanwhile, the atmosphere controlling seal portion 27f and the negative pressure controlling seal portion 27g are biased by the valve spring 27d to move towards the left in FIG. 6 according to the movement of the plunger member 82. The negative pressure controlling seal portion 27g is in engagement with the negative pressure controlling valve seat 14a, and the atmosphere controlling seal portion 27f is out of engagement with the plunger member 82. Therefore, the communication between the variable pressure chamber 61 and the negative pressure source 87 is cut off and the variable pressure chamber 61 communicates with the atmosphere. The movable power piston 14 moves the output rod 16 and applies the brake force by the inflow of the atmosphere to the variable pressure chamber 61 which makes the master cylinder piston (not shown) operate, and the brake pressure is produced in the master cylinder.

The reaction force according to the brake pressure generated in the master cylinder and the brake operating force generated by the operation of the brake pedal 71 and transmitted to the second input member 77 is respectively applied to both sides of the reaction disc 31. Thus, the reaction force and the brake operating force are balanced.

When the driver judges that there is no need for brake operation and the brake pedal is returned to the initial position, the plunger member 82 moves towards the right integrally with the first input member 74 according to the returning of the second input rod 23b. The atmosphere controlling seal portion 27g is in engagement with the atmosphere controlling valve seat 82bb of the second plunger 82b and the negative pressure controlling seal portion 27g is out of engagement with the negative pressure controlling valve seat 14a of the power piston 14. Consequently, the communication between the variable pressure chamber 61 and the atmosphere is cut off, and the variable pressure chamber 61 communicates with the constant pressure chamber 62 through the air path 14c, the path 27i, the clearance between the negative controlling valve seat 14a and the negative controlling seal portion 27g, the constant pressure chamber 62, and the connector 19, so that the degree of the aggressive pressure in the variable pressure chamber 61 decreases and the servo force to the power piston 10 decreases.

When the brake operating force applied to the first input rod 23a decreases under the pre-set load force of the spring 73, the biasing force of the spring 73 separates the first input rod 23a and the second input rod 23b. Therefore, the contact between the contact portion 76 and the operation portion 75a of the micro switch 75 is canceled, and the electric signal produced by the micro switch 75 ceases. When the micro computer (not shown) detects that the electric signal of the micro switch 75 ceases, the supply of electric power from the electric power source 87 to the solenoid 79 is stopped.

Therefore, the solenoid 79 does not generate the electromagnetic force to the plunger member 82, and the plunger member 82 is returned towards the right in FIG. 6 by the biasing force of the biasing spring 84. According to the movement of the plunger member 82 towards the right, the atmosphere controlling seal portion 27f becomes engaged with the plunger member 82 and is returned towards the right in FIG. 6 and the negative pressure controlling seal portion 27g comes out of engagement with the valve seat 14a of the movable power piston 14. Therefore, the communication between the variable pressure chamber 61 and the atmosphere is cut off and the variable pressure chamber 61 communicates with the negative pressure source 70 of the vehicle, so that the differential pressure between the variable pressure chamber 61 and the constant pressure chamber 62 decreases. Thus, the operation state of the vacuum servo unit 1 comes back to the normal state, and after this, the operation state returns to the initial state according to the decrease of the input force.

The biasing force of the spring 84 biases the plunger member 82 and the control valve 27 towards the right side against the force generated by the atmospheric pressure actuating the plunger member 82 and the control valve 27. The magnitude of the force generated by the atmospheric pressure actuating the plunger member 82 and the control valve 27 is decided by subtracting the diameter of the seal member 83 from the diameter of the annular circle formed between the atmosphere controlling seal portion 27f and the atmosphere controlling valve seat 82bb and by subtracting the diameter of the annular circle formed between the atmosphere controlling seal portion 27f and the atmosphere controlling valve seat 82bb from the effective diameter of the control valve 27, i.e., the diameter of the seal member 27b.

Accordingly, in the third embodiment discussed above, compared to the seal member 83, the negative pressure controlling seal portion 27g is located closer to the output rod 16 by the valve plate 27e. Therefore, it is possible to remove an obstacle that prevents the diameter of the seal member 83 from enlarging, so that it is possible to make the diameter of the seal member 83 close to the diameter of the atmosphere controlling seal portion 27f of the seal member 27b of the first retainer 27a. In this vacuum servo unit 1, the diameter of the seal member 27b is reduced because the seal member 83 performs a sealing function at the inner peripheral portion. Therefore, the diameter of the seal member 83 approaches the diameter of the seal member 27b of the first retainer 27a.

When the diameter of the seal member 83, the diameter of the atmosphere controlling seal portion 27f, and the diameter of the seal member 27b are equal to each other, the biasing force of the spring 84 can be reduced to a minimum. Moreover, in the case that the solenoid 79 is operated to actuate the plunger member 82 against the biasing force of the spring 84, the electromagnetic force of the solenoid 79 can be decreased and it is possible to miniaturize the vacuum servo unit 1.

In addition, because the radial projection 74aa is provided on the input member 74 and contacts the inner peripheral portion of the movable power piston 14, the inclination of the input member 74 with respect to the movable power piston 14 is restricted, so that the plunger member 82 can actuate smoothly. If the input member 74 inclined with respect to the movable power piston 14, this does not influence the actuation of the plunger member 74.

The other actions and effects of the third embodiment are similar to those of the first embodiment and therefore, an explanation has therefore been omitted.

FIG. 7 illustrates a fourth embodiment of the present invention, in which elements similar to those in the third embodiment are identified with the same reference numbers. In FIG. 7, the vacuum servo unit differs from the third embodiment in that a seal member 27b is provided on the spring retainer 27c, and the seal member 27b performs a sealing function at the outer peripheral portion thereof.

In the fourth embodiment mentioned above, the plunger member is moved by the solenoid towards the left side. But the composition of the vacuum servo unit 1 is not limited to this particular configuration, for example, in a vacuum servo unit in which the plunger is moved by the solenoid towards the right side, i.e., towards the brake pedal, effects similar to the third embodiment are achieved.

Accordingly, in the fourth embodiment mentioned above, compared to the seal member 83, the negative pressure controlling seal potion 27g is located closer to the output rod 16 by the valve plate 27e. Therefore, it is possible to remove an obstacle that prevents the diameter of the seal member 83 from enlarging, so that it is possible to make the diameter of the seal member 83 closer to the diameter of the seal member 27b and the atmosphere controlling seal portion 27f, so that the electromagnetic force of the solenoid 79 can be reduced and the size of the solenoid 79 can also be reduced.

Moreover, the path 27i is provided on the valve plate 27e and the air path 14c is provided on the movable power piston 14. Therefore, the axial space from the atmosphere controlling seal portion 27f to the variable pressure chamber 61 is not needed and the response of the vacuum servo unit 1 can be increased.

The other actions and effects of the fourth embodiment are similar to those in the third embodiment and so an explanation is omitted.

Figure 8:
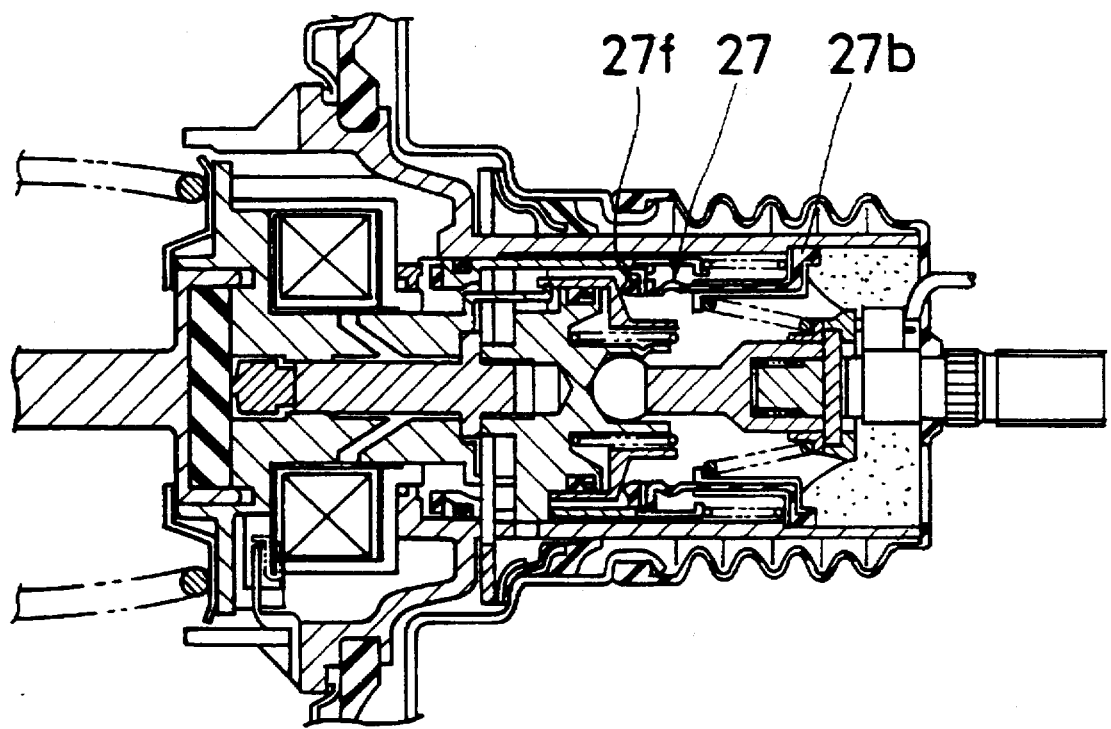
FIG. 8 is a cross-sectional view of a vacuum servo unit according to a fifth embodiment of the present invention.

FIG. 8 illustrates a fifth embodiment of the present invention, wherein elements similar to those in the third embodiment are identified with the same reference numbers. The embodiment of FIG. 8 is different from the third embodiment in that the control valve 27 is formed such that the air valve member 27f and the seal member 27b are unified.

In the fifth embodiment mentioned above, it is possible to make the vacuum servo unit 1 operate automatically and provide a low cost vacuum servo unit.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A vacuum servo unit for a vehicle braking system comprising:

a housing defining therein a pressure chamber;

a movable wall member provided in said housing for dividing said pressure chamber into a constant pressure chamber for communicating with a negative pressure source and a variable pressure chamber for selectively communicating with the atmosphere and said negative pressure source;

a movable power piston integrally connected with said movable wall member. said movable power piston being formed as one piece;

a valve plunger provided in said movable power piston and being axially movable;

an input rod connected with a brake operating member at a first end thereof and connected with said valve plunger at a second end thereof;

an output member outputting a propulsion force of said movable power piston caused by a movement of said movable wall toward an outside of said housing;

an atmosphere controlling valve seat formed on said valve plunger;

a negative pressure controlling valve seat formed in said movable power piston;

a control valve provided in said movable power piston, and said control valve having an atmosphere controlling seal portion to cooperate with said atmosphere controlling valve seat for controlling a communication of said variable pressure chamber with the atmosphere, and a negative pressure controlling seal portion to cooperate with said negative pressure controlling vane seat for controlling a communication between said variable pressure chamber and said constant pressure chamber;

wherein said negative pressure controlling valve seat is arranged in a position spaced from said atmosphere controlling valve seat in an axial direction, said atmosphere and said negative pressure controlling seal portions of said control valve being spaced in the axial direction to cooperate with said atmosphere and said negative pressure controlling valve seats respectively, an external surface of said control valve being in airtight engagement with an internal surface of said movable power piston, and said control valve having a path provided between said atmosphere controlling seal portion and said negative pressure controlling seal portion for allowing communication between said variable pressure chamber and said constant pressure chamber when said negative pressure controlling valve seat is out of engagement with said negative pressure controlling seal portion and allowing communication between said variable pressure chamber and the atmosphere when said atmosphere controlling valve seat is out of engagement with said atmosphere controlling seal portion.

2. A vacuum servo unit as claimed in claim 1, wherein said movable power piston has a rear cylindrical portion extending to the outside of said housing, a diameter of said atmosphere controlling valve seat, a diameter of said negative pressure controlling valve seat, a diameter of said atmosphere controlling seal portion, and a diameter of said negative pressure controlling seal portion are less than or equal to a diameter of a portion of said rear cylindrical portion in which said atmosphere controlling seal portion is located.

3. A vacuum servo unit as claimed in claim 1, wherein said power piston has an air path for allowing communication between said variable pressure chamber and said constant pressure chamber when said negative pressure controlling valve seat is out of engagement with said negative pressure controlling seal portion and allowing communication between said variable pressure chamber and the atmosphere when said atmosphere controlling valve seat is out of engagement with said atmosphere controlling seal portion by cooperating with said path, and said air path is near said path of said control valve.

4. A vacuum servo unit as claimed in claim 3, wherein said control valve has a stopper for limiting a rotation of said control valve against said movable power piston.

5. A vacuum servo unit as claimed in claim 4, wherein said stopper is provided on a first end portion of said control valve, and said movable power piston has a hole to which said stopper is in engagement.

6. A vacuum servo unit as claimed in claim 5, wherein said hole can allow communication between said variable pressure chamber and said constant pressure chamber.

7. A vacuum servo unit as claimed in claim 3, further comprising a key member for determining an amount of movement of said valve plunger against said movable power piston in the axial direction, and said key member limits rotation of said control valve against said movable power piston.

8. A vacuum servo unit as claimed in claim 3, further comprising a biasing member for biasing said atmosphere and negative pressure controlling seal portions, of said control valve toward said atmosphere and negative pressure controlling valve seat.

9. A vacuum servo unit as claimed in claim 8, wherein said control valve has a cylindrical body, said negative pressure controlling seal portion is provided on a first end of said cylindrical body, said atmosphere controlling seal portion is provided on an inner peripheral surface of said cylindrical body, said cylindrical body has a seal portion that is in airtight engagement with an inner peripheral side of said power piston at an outer peripheral surface thereof, said seal portion is located on a rear side of said negative pressure controlling seal portion and said atmosphere controlling seal portion, and said control valve contacts said biasing member at a second end of the cylindrical body.

10. A vacuum servo unit for a vehicle braking system comprising:

a housing defining therein a pressure chamber;

a movable wall member provided in said housing for dividing said pressure chamber into a constant pressure chamber for communicating with a negative pressure source and a variable pressure chamber for selectively communicating with the atmosphere and said negative pressure source;

a movable power piston integrally connected with said movable wall member;

an input member provided in said movable power piston, and being axially movable by brake actuation;

a plunger member provided in said movable power piston and engaged with said input member said plunger member being movable in an axial direction according to movement of said input member;

an input rod connected with a brake operating member at a first end thereof and connected with said input member at a second end thereof;

an output member outputting a propulsion force of said movable power piston caused by a movement of said movable wall toward an outside of said housing;

an atmosphere controlling valve seat formed on said plunger member;

a negative pressure controlling valve seat formed in said movable power piston;

a control valve having an atmosphere controlling seal portion for cooperating with said atmosphere controlling valve seat to control communication of said variable pressure chamber with the atmosphere, a negative pressure controlling seal portion for cooperating with said negative pressure controlling valve seat to control communication between said variable pressure chamber and said negative pressure chamber;

a solenoid selectively electrically connected with an electric power source to actuate said plunger member;

said negative pressure controlling valve seat being arranged in a position spaced from said atmosphere controlling valve seat in an axial direction, and said atmosphere controlling seal portion and said negative pressure controlling seal portion of said control valve being spaced in the axial direction to cooperate with said atmosphere controlling valve seat and said negative pressure controlling valve seat respectively, said atmosphere controlling seal portion being connected with said negative pressure controlling seal portion by a connecting portion, and said input member having a radial projection that contacts an inner peripheral portion of said movable power piston through said connecting portion.

11. A vacuum servo unit as claimed in claim 10, wherein said connecting portion has a path for allowing communication between said variable pressure chamber and said constant pressure chamber when said negative pressure controlling valve seat is out of engagement with said negative pressure controlling seal portion and allowing communication between said variable pressure chamber and the atmosphere when said atmosphere controlling valve seat is out of engagement with said atmosphere controlling seal portion.

12. A vacuum servo unit as claimed in claim 11, wherein said movable power piston has an air path for allowing communication between said variable pressure chamber and said constant pressure chamber when said negative pressure controlling valve seat is out of engagement with said negative pressure controlling seal portion and allowing communication between said variable pressure chamber and the atmosphere when said atmosphere controlling valve seat is out of engagement with said atmosphere controlling seal portion by cooperating with said path of said control valve.

13. A vacuum servo unit for a vehicle braking system comprising:

a housing defining therein a pressure chamber;

a movable wall member provided in said housing for dividing said pressure chamber into a constant pressure chamber for communicating with a negative pressure source and a variable pressure chamber for selectively communicating with the atmosphere and said negative pressure source;

a movable power piston integrally connected with said movable wall member;

an input member provided in said movable power piston and being axially movable by brake actuation;

a plunger member provided in said movable power piston and engaged with said input member, said plunger member being movable in an axial direction according to movement of said input member;

an input rod connected with a brake operation member at a first end thereof and connected with said input member at a second end thereof;

an output member outputting a propulsion force on said movable power piston caused by a movement of said movable wall toward an outside of said housing;

an atmosphere controlling valve seat formed on said plunger member;

a negative pressure controlling valve seat formed in said movable power piston;

a control valve having an atmosphere controlling seal portion to cooperate with said atmosphere controlling valve seat for controlling communication of said variable pressure chamber with the atmosphere, a negative pressure controlling seal portion to cooperate with said negative pressure controlling valve seat for controlling communication between said variable pressure chamber and said negative pressure chamber;

a solenoid selectively electrically connected with an electric power source for actuating said plunger member;

said negative pressure controlling valve seat being arranged in a position spaced from said atmosphere controlling valve seat in an axial direction, said atmosphere controlling seal portion and said negative pressure controlling seal portion of said control valve being spaced in the axial direction to cooperate with said atmosphere controlling valve seat and said negative pressure controlling valve seat respectively, said plunger member being in air tight engagement with said input member at an inner peripheral portion thereof through a seal member, and said seal member being located between said negative pressure controlling seal portion and said atmosphere controlling seal portion.

14. A vacuum servo unit as claimed in claim 13, wherein said movable power piston has a rear cylindrical portion, a diameter of said atmosphere controlling valve seat, a diameter of said negative pressure controlling valve seat, a diameter of said atmosphere controlling seal portion, and a diameter of said negative pressure controlling seal portion being less than or equal to a diameter of a portion of said rear cylindrical portion in which said atmosphere controlling seal portion is located.

15. A vacuum servo unit as claimed in claim 13, wherein said power piston has an air path for allowing communication between said variable pressure chamber and said constant pressure chamber when said negative pressure controlling valve seat is out of engagement with said negative pressure controlling seal portion and for allowing communication between said variable pressure chamber and the atmosphere when said atmosphere controlling valve seat is out of engagement with said atmosphere controlling seal portion.

16. A vacuum servo unit as claimed in claim 13, wherein said control valve has a stopper for limiting rotation of said control valve against said movable power piston.

17. A vacuum servo unit as claimed in claim 16, wherein said stopper is provided on a first end portion of said control valve, and said movable power piston has a hole in which said stopper is positioned.

18. A vacuum servo unit as claimed in claim 13, including a key member for determining an amount of movement of said valve plunger against said movable power piston in the axial direction, said key member limiting rotation of said control valve against said movable power piston.

* * * * *